United States Patent
Sagong et al.

(10) Patent No.: US 10,014,891 B2
(45) Date of Patent: Jul. 3, 2018

(54) SCHEDULING METHOD AND APPARATUS IN WIRELESS COMMUNICATION SYSTEM

(71) Applicant: Samsung Electronics Co., Ltd., Gyeonggi-do (KR)

(72) Inventors: Min Sagong, Suwon-si (KR); Ji-Yun Seol, Seongnam-si (KR); Woo-Myong Park, Suwon-si (KR); Seok-Ki Ahn, Suwon-si (KR); Chi-Woo Lim, Suwon-si (KR); Sung-Nam Hong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/512,020

(22) PCT Filed: Sep. 16, 2015

(86) PCT No.: PCT/KR2015/009720
§ 371 (c)(1),
(2) Date: Mar. 16, 2017

(87) PCT Pub. No.: WO2016/043519
PCT Pub. Date: Mar. 24, 2016

(65) Prior Publication Data
US 2017/0302315 A1    Oct. 19, 2017

(30) Foreign Application Priority Data

Sep. 16, 2014    (KR) ........................ 10-2014-0122469

(51) Int. Cl.
*H04L 5/00*     (2006.01)
*H04B 1/10*     (2006.01)
(Continued)

(52) U.S. Cl.
CPC ............ *H04B 1/1027* (2013.01); *H04L 27/10* (2013.01); *H04L 27/34* (2013.01); *H04B 17/336* (2015.01)

(58) Field of Classification Search
CPC ...... H04B 1/1027; H04B 17/336; H04L 27/34; H04L 27/10
See application file for complete search history.

(56) References Cited

U.S. PATENT DOCUMENTS

| 9,288,091 | B2 | 3/2016 | Seol et al. |
| 9,548,848 | B1 * | 1/2017 | Patel ..................... H04L 5/0057 |

(Continued)

FOREIGN PATENT DOCUMENTS

| KR | 10-2015-0057694 A | 5/2015 |
| WO | 2014-098537 A1 | 6/2014 |
| WO | 2014-098541 A1 | 6/2014 |

OTHER PUBLICATIONS

Jeffrey G. Andrews, et al., "What Will 5G Be," IEEE JSAC Special Issue on 5G Wireless Communication Systems, arXiv:1405.2957v1 [cs.IT], May 12, 2014, p. 1-17.

*Primary Examiner* — Dac Ha (57) ABSTRACT

The present disclosure relates to a 5G or pre-5G communication system to be provided for supporting a higher data transfer rate beyond a 4G communication system such as LTE. The present invention relates to a NOMA system based FQAM connection method and an apparatus therefor. The present invention can increase the user transfer rate at a cell boundary. The scheduling method in a wireless communication system, according to an embodiment of the present invention, comprises a step of receiving a signal-to-interference-noise ratio (SINR) value and an alpha value from a terminal; a step of determining, on the basis of the SINR value and the alpha value, a Gaussian SINR value; a step of pairing users on the basis of the Gaussian SINR value; and
(Continued)

a step of re-computing MCS on the basis of a re-computed alpha value.

20 Claims, 11 Drawing Sheets

(51) Int. Cl.
*H04L 27/34* (2006.01)
*H04L 27/10* (2006.01)
*H04B 17/336* (2015.01)

(56) References Cited

U.S. PATENT DOCUMENTS

| | | |
|---|---|---|
| 2007/0053471 A1 | 3/2007 | Feher |
| 2012/0026910 A1* | 2/2012 | Ko .................... H04W 72/1231 370/252 |
| 2014/0153625 A1* | 6/2014 | Vojcic .................... H04L 1/005 375/224 |
| 2014/0177756 A1 | 6/2014 | Park et al. |
| 2015/0358194 A1 | 12/2015 | Yu et al. |
| 2016/0294523 A1 | 10/2016 | Jeong et al. |

* cited by examiner

SCHEDULING METHOD AND APPARATUS IN WIRELESS COMMUNICATION SYSTEM

CROSS-REFERENCE TO RELATED APPLICATION(S)

The present application claims priority under 35 U.S.C. § 365 to International Patent Application No. PCT/KR2015/009720 filed Sep. 16, 2015, entitled "SCHEDULING METHOD AND APPARATUS IN WIRELESS COMMUNICATION SYSTEM", and, through International Patent Application No. PCT/KR2015/009720, to Korean Patent Application No. 10-2014-0122469 filed Sep. 16, 2014, each of which are incorporated herein by reference into the present disclosure as if fully set forth herein.

TECHNICAL FIELD

The present disclosure relates to a scheduling method and apparatus in a wireless communication system.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mmWave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Recently, to meet continuously increasing demands for wireless data traffics, wireless communication systems have evolved to support higher data rates. For example, to increase a data rate in a wireless communication system, research has been actively conducted to improve frequency improvement and to increase channel capacity based on communication techniques such as OFDMA, MIMO transmission/reception, and so forth.

In addition, it is necessary to improve limitation in overall system performance, caused by cell-edge users in a situation of a low signal-to-noise ratio (SNR) in a far cell boundary from a cell center or in a situation of a low carrier-to-interference and noise ratio (CINR) having high interference from a base station of a neighboring cell. To increase transmission efficiency for cell-edge users, techniques such as inter-cell interference-coordination (ICIC), CoMP, reception-end interference cancellation, etc., have been developed.

SUMMARY

The present disclosure provides a multi-access method and apparatus in a wireless communication system.

The present disclosure provides a method and apparatus for increasing a cell-edge throughput in a wireless communication system.

The present disclosure provides an FQAM method and apparatus based on a NOMA system instead of QAM-based NOMA in a wireless communication system.

A scheduling method by a base station in a wireless communication system according to an embodiment of the present disclosure includes receiving a signal-to-interference-noise ratio (SINR) value and an alpha value from a terminal, determining a Gaussian SINR value based on the SINR value and the alpha value, performing user pairing based on the Gaussian SINR value, and re-computing a modulation and coding scheme (MCS) based on the re-computed alpha value.

A scheduling apparatus in a wireless communication system according to an embodiment of the present disclosure includes a receiver configured to receive an SINR value and an alpha value from a terminal and a controller configured to determine a Gaussian SINR value based on the SINR value and the alpha value, to perform user pairing based on the Gaussian SNR value, and to re-compute a MCS based on the re-computed alpha value.

A method for cancelling interference by a terminal in a wireless communication system includes receiving an indicator from a base station, cancelling interference of a received signal based on the indicator, and performing non-Gaussian decoding, in which the indicator is transmitted from the base station to the terminal if a re-computed MCS value of a far user corresponds to hybrid frequency shift keying (FSK) and quadrature amplitude modulation (QAM) (FQAM), and the re-computing of the MCS value includes determining a Gaussian SINR value based on an SINR value and an alpha value by the base station, performing user pairing based on the Gaussian SINR value, and performing MCS re-computation based on an alpha value re-computed for a paired user.

An apparatus for cancelling interference by a terminal in a wireless communication system according to an embodiment of the present disclosure includes a receiver configured to receive an indicator from a base station and a controller configured to cancel interference of a received signal based on the indicator and to perform non-Gaussian decoding, in which the indicator is transmitted from the base station to the terminal if a re-computed MCS value of a far user corresponds to hybrid FQAM, and re-computing of the MCS value includes determining a Gaussian SINR value based on an SINR value and an alpha value by the base station, performing user pairing based on the Gaussian SINR value, and performing MCS re-computation based on an alpha value re-computed for a paired user.

The present disclosure may improve cell-edge throughput based on convergence of FQAM and NOMA in a wireless communication system.

DETAILED DESCRIPTION

Hereinafter, exemplary embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted.

Terms or words used in the specification and claims herein should not be construed as having a general and lexical meaning and should be construed as having the meaning and concept meeting the technical idea of the present disclosure based on a principle that the present inventors can properly define the concepts of terms in order to elucidate their own invention in the best method.

A user described herein means a mobile terminal or a terminal, but will be expressed as a user below.

In a wireless communication system, Gaussian assumption will be assumed with respect to an interference signal for performing decoding with low complexity. Thus, to make characteristics of an interference signals as close as possible to Gaussian, a quadrature amplitude modulation (QAM)-based modulation scheme will be mainly used. However, a channel capacity of a non-Gaussian channel is greater than that of a Gaussian channel, such that proper decoding may lead to higher decoding performance in the non-Gaussian channel than in the Gaussian channel. Thus, a modulation scheme that causes an interference signal to have non-Gaussian characteristics needs to be developed, and modulation scheme introduced for this end is hybrid frequency shift keying (FSK) and QAM modulation (FQAM).

Figure 1:
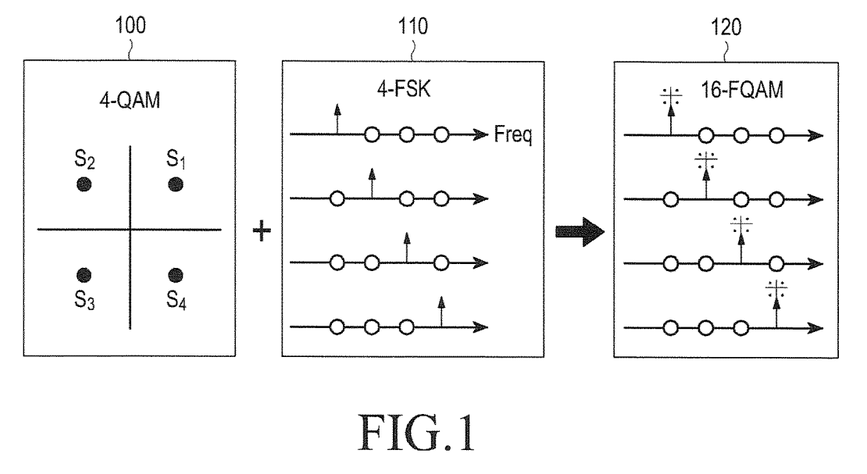
FIG. 1 illustrates an example in which FQAM is used.

FIG. 1 illustrates an example in which FQAM is used.

FQAM is a hybrid modulation scheme in which QAM and FSK are combined as shown in FIG. 1, and has both high spectral efficiency of QAM and the characteristic of making an interference signal of FSK non-Gaussian. That is, FQAM is a communication scheme that configures interference signals from neighboring base stations in a non-Gaussian form by using a characteristic in which a non-Gaussian interference signal has a high transmission gain.

Also, with the power-efficient feature of FSK, FQAM has higher performance than QAM in a low SNR.

However, in a real situation, there are few users having low reception SINRs enough for a sufficient gain of FQAM when compared to a gain of QAM. Moreover, it is practically impossible to maintain load balancing of inter-cell FQAM users, making it difficult to provide intended non-Gaussianity to all FQAM users. For reference, generally, the number of users, suitable for FQAM, differs from time to time and from cell to cell as shown in FIG. 2.

Figure 2:
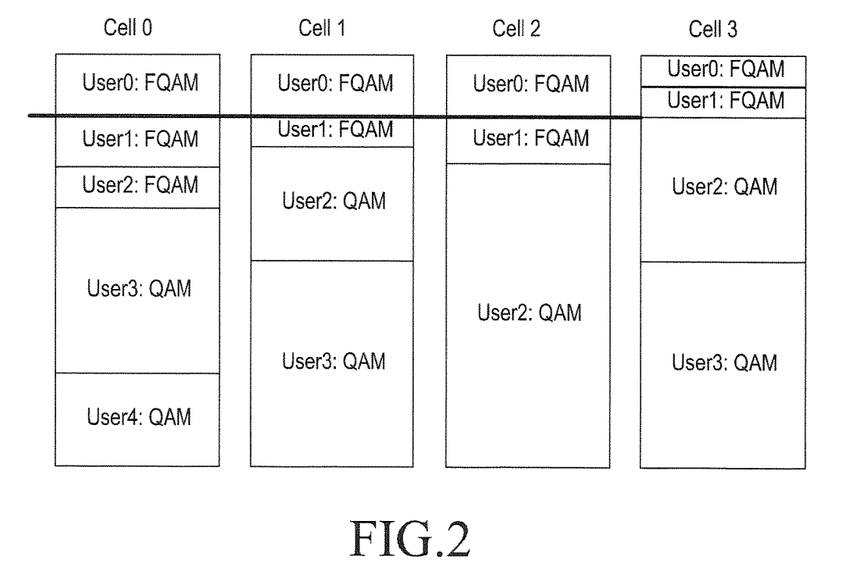
FIG. 2 illustrates a modulation scheme used by a cell-specific user.

FIG. 2 illustrates a modulation scheme used by a cell-specific user.

Beside from FQAM, NOMA has been proposed to improve a throughput of a cell-edge user without a large loss of an average throughput.

Figure 3A:
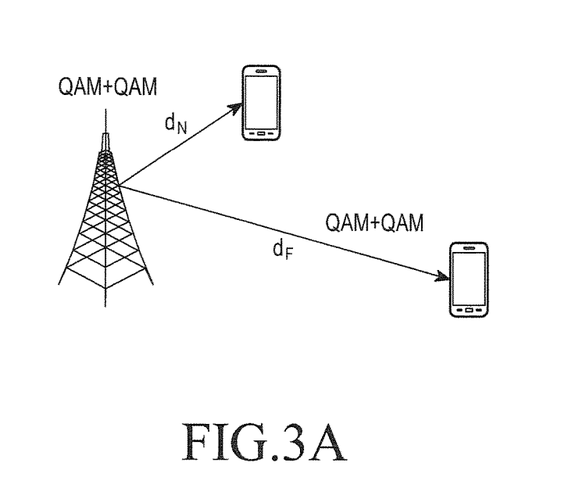
FIGS. 3A and 3B are structural diagrams of a NOMA system.
Figure 3B:
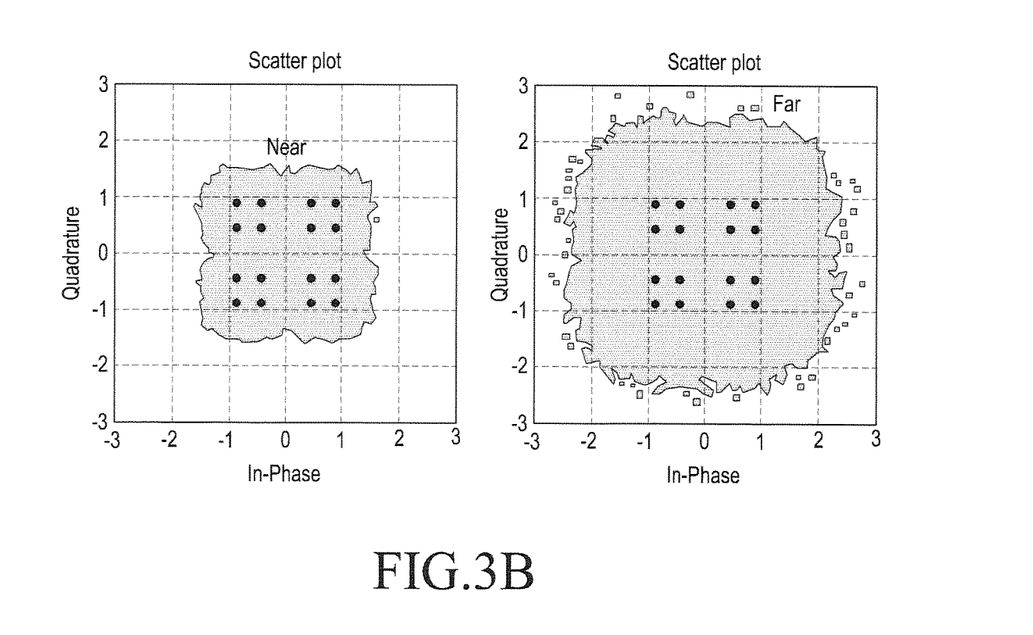
Figure 4A:
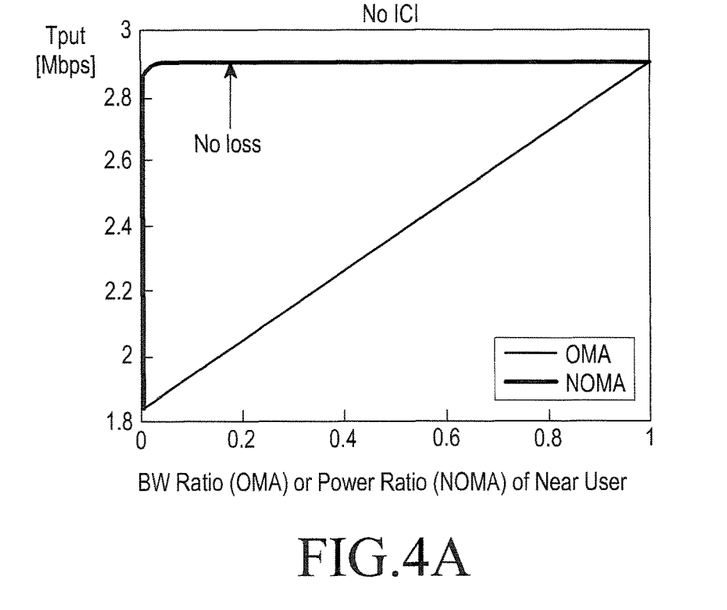
FIGS. 4A and 4B are graphs showing a throughput with respect to a bandwidth ratio or a power ratio of a short-range user in a NOMA system.
Figure 4B:
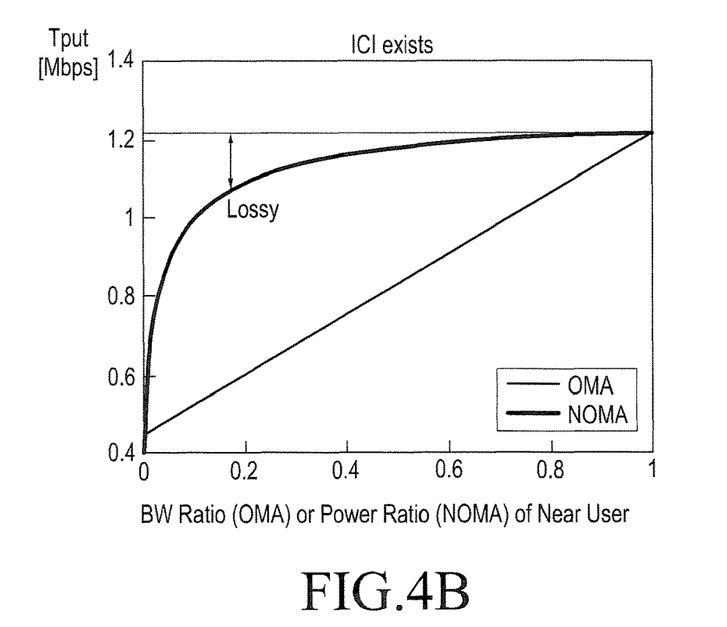

FIGS. 3A and 3B are structural diagrams of a NOMA system, and FIGS. 4A and 4B are graphs showing a throughput with respect to a bandwidth ratio or a power ratio of a short-range user in a NOMA system.

A NOMA system is a system that performs transmission to several different users in a cell by using QAM with an identical resource as shown in FIG. 3A. Herein, NOMA using an existing method is referred to as "QAM based NOMA".

Referring to FIG. 3B, by using an identical resource for several different users in a cell, SIC processing is performed by a receiver in a short distance and Gaussian noise processing is performed by a receiver in a remote distance.

FIG. 4A shows a throughput with respect to a bandwidth ratio or a power ratio of a short-range user in case of absence of ICI, and FIG. 4B shows a throughput with respect to a bandwidth ratio or a power ratio of a short-range user in case of presence of ICI.

The performance of NOMA has a high dependency on a scheduling result, and performance degradation with respect to unintended interference is much greater than in case of orthogonal frequency-division multiple access (OFDMA) as shown in FIG. 4B.

The present disclosure proposes an innovative multiple access technique that secures inherent performance gains of FQAM and NOMA by solving problems in which a performance gain is difficult to expect in case of use of FQAM and NOMA and also obtains an additional gain based on synergy effect between the two techniques.

Figure 5A:
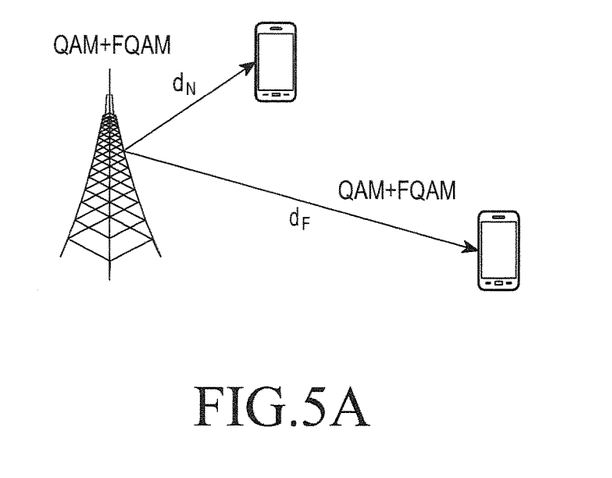
FIGS. 5A and 5B are structural diagrams of a NOMA system based on FQAM according to an embodiment of the present disclosure.
Figure 5B:
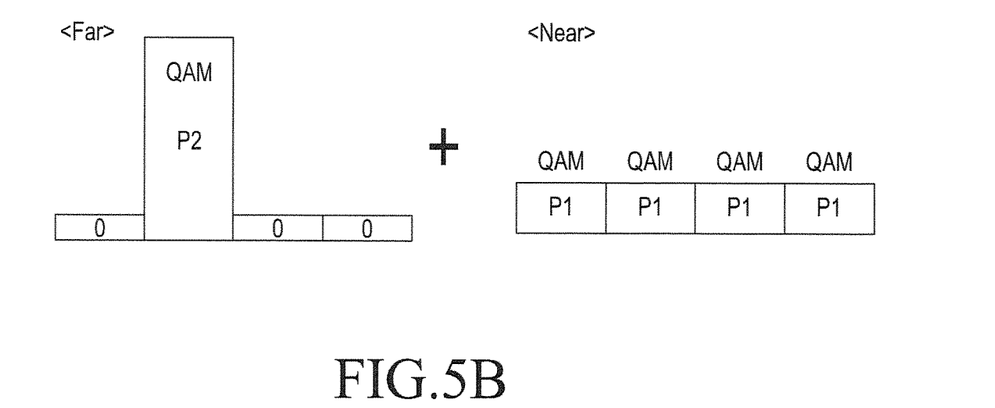

FIGS. 5A and 5B are structural diagrams of a NOMA system based on FQAM according to an embodiment of the present disclosure.

A NOMA system based on FQAM performs user pairing in which at least one of the paired users performs transmission by using FQAM, as shown in FIG. 5A. User pairing indicates a method for selecting users that are to perform overlapping transmission by using an identical resource at the same time.

By doing so, the following advantages may be expected.

First, if a NOMA system based on FQAM operates by using a method according to an embodiment of the present disclosure, all users including a cell-edge user may have a non-Gaussian interference-cell interference (ICI) benefit.

This innovative result is different from general FQAM that generates non-Gaussian ICI only for a cell-edge user.

Second, referring to FIG. 5B, the performance of a far user may be improved when compared to an existing QAM-based NOMA system. This is because FQAM has a higher throughput than QAM in a low SNR region.

Last, for a near user of NOMA, a high-performance SIC method may be developed using characteristics of FQAM constellation and may be used or a low-complexity SIC method may be developed and used. However, the above detailed SIC method will not be described in detail because of departing from the scope of the present disclosure.

Figure 6:
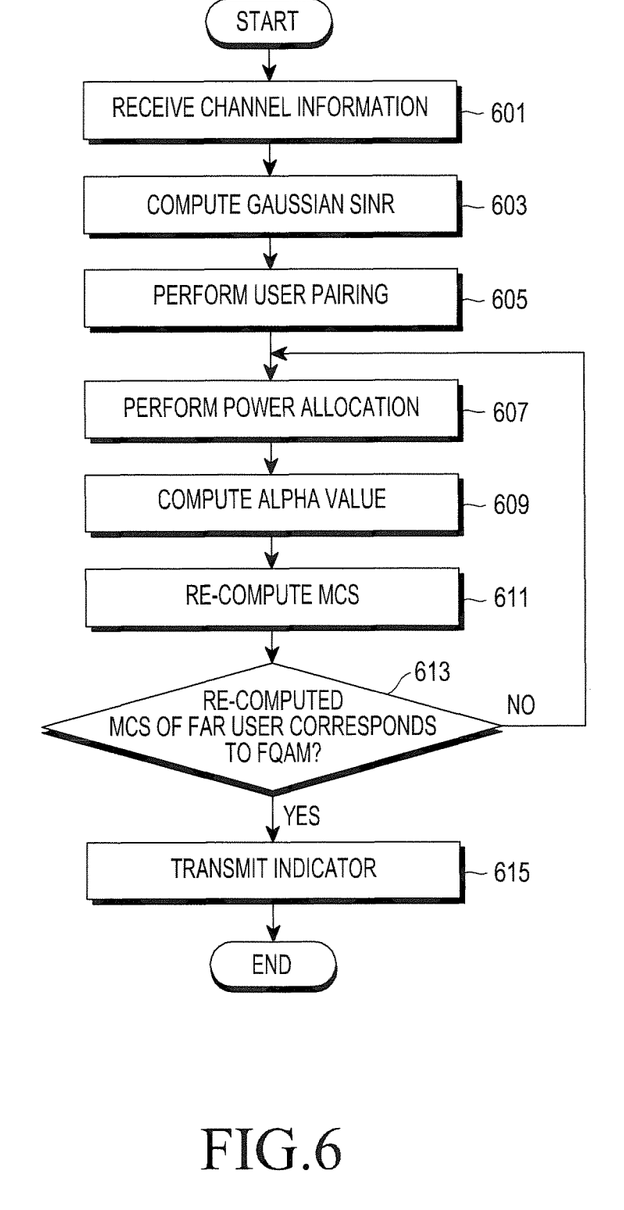
FIG. 6 is a flowchart of a scheduling method in a mobile communication system according to an embodiment of the present disclosure.

FIG. 6 is a flowchart of a scheduling method in a mobile communication system according to an embodiment of the present disclosure.

In operation 601, a base station receives channel status information from a terminal.

The channel status information may include an SINR, a carrier-to-interference and noise ratio (CINR), an average CINR, a dispersion or standard deviation with respect to a CINR, a received signal strength indicator (RSSI), an average RSSI, a dispersion or standard deviation with respect to an RSSI, an alpha ($\alpha$) value ($\alpha_{ICI}$) and a beta ($\beta$) value indicating interference characteristics of a complex generalized Gaussian (CGG) interference model, a preferred modulation and coding scheme (MCS) level, and so forth.

In operation 603, the base station computes a Gaussian SINR.

The Gaussian SINR may be determined or computed based on an alpha value and an SINR as shown in Table 1. The Gaussian SINR value provided below is determined in advance and is stored in advance between the terminal and the base station.

TABLE 1

| Alpha | SINR | Gaussian SINR |
|-------|------|---------------|
| 0.5   | −8 dB | −4 dB |
|       | −6 dB | −3 dB |
|       | −4 dB | −2 dB |
|       | −2 dB | −1 dB |
| 0.7   | −7 dB | −5 dB |
|       | −5 dB | −3.3 dB |
|       | −3 dB | −2 dB |
| 1.0   | −6 dB | −5 dB |
|       | −4 dB | −3.5 dB |
|       | −2 dB | −1.7 dB |

Figure 7:
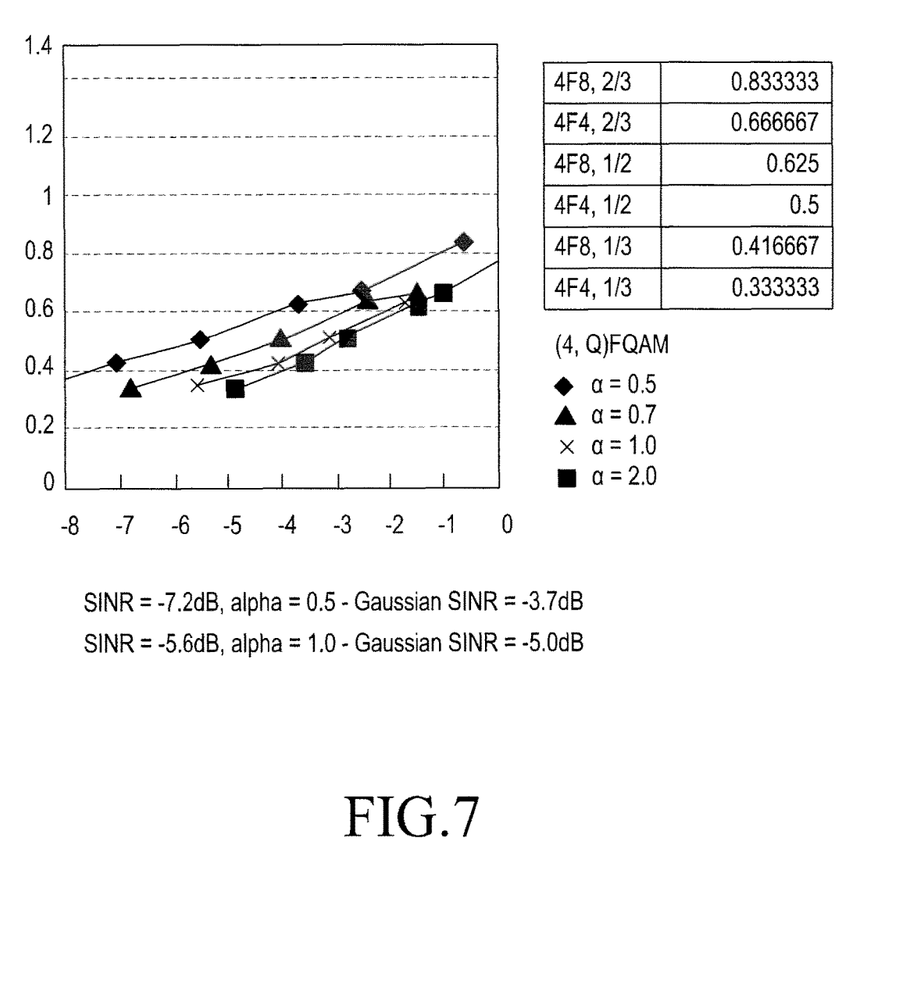
FIG. 7 is a diagram illustrating an example of computing a Gaussian SINR according to an embodiment of the present disclosure.

FIG. 7 is a diagram illustrating an example of computing a Gaussian SINR according to an embodiment of the present disclosure.

In FIG. 7, 0.833333, 0.666667, 0.625, 0.5, 0.416667, and 0.333333 indicate spectrum efficiency values with respect to alpha values.

In operation 605, the base station performs user pairing based on a Gaussian SINR.

The user pairing is performed based on at least one of a channel status of each user and a size of a packet to be transmitted to each user.

When a modulation method and a modulation order are selected for each user, a method in which whether to use FQAM is determined based on proximity with a neighboring cell as well as a channel status of each paired user and systematically (in agreement with the neighboring cell) preset value is used for a tonnage per modulation symbol of FQAM.

In operation 607, the base station determines (P1, P2) based on the SINR and the $\alpha_{ICI}$ value for transmission of FQAM after overlapping of a far user.

When power allocation is performed for each user, a hull curve of FQAM as well as a hull curve of QAM may be used together.

It is assumed that an alpha ($\alpha$) and an SINR reported to a base station from a terminal 1 are 0.5 and 2 dB, respectively, and a and an SINR reported to the base station from a terminal 2 are 1.8 and 16 dB, respectively. Terminal pairing is performed. In this case, a near terminal is assumed to be the terminal 2 and a far terminal is assumed to be the terminal 1. $P_F$ ($P_H = 1 - P_F$) is determined such that the far terminal is allocated with FQAM. Herein, $P_F$ indicates a power of the far terminal and $P_H$ indicates a power of the near terminal.

In this case, $P_F$ is allocated such that SINR after overlapping is less than 0 dB.

An SINR before overlapping ($SINR_N$), which is the SINR of the near terminal, and an SINR before overlapping ($SINR_F$), which is the SINR of the far terminal, are as shown in Equation 1 and Equation 2.

$$SINR_N = \frac{|h_N|^2}{WN_0} = 10 \text{ dB} \quad [\text{Equation 1}]$$

$$SINR_F = \frac{|h_F|^2}{WN_0} = 2 \text{ dB} \quad [\text{Equation 2}]$$

In Equation 1 and Equation 2, h indicates a channel gain, $N_0$ indicates a one-sided power spectrum density (PSD) of a background noise, and W indicates a bandwidth for use.

An SINR after overlapping ($SINR_N$), which is the SINR of the near terminal, and an SINR before overlapping ($SINR_F$), which is the SINR of the far terminal, are as shown in Equation 3 and Equation 4.

$$SINR_N = \frac{P_N |h_N|^2}{WN_0} \quad [\text{Equation 3}]$$

$$SINR_F = \frac{P_F |h_F|^2}{P_N |h_F|^2 + WN_0} < 0 \text{ dB} \quad [\text{Equation 4}]$$

$P_N$ and $P_F$ are re-computed based on an a value after overlapping.

If an alpha value of a far user after overlapping increases from 0.5 to 0.7 in a situation where $P_F$ is determined such that $SINR_F$ after overlapping is −0.5 during a $P_F$ determining process, a gain for FQAM allocation exists only when an SINR is less than −1.5 dB for the alpha value of 0.7, $P_F$ is re-computed to make the SINR less than −1.5 dB.

An SINR range where the use of FQAM is more beneficial than the use of QAM for each $\alpha$ value is as described below.

Alpha=0.5: SINR<0 dB
Alpha=0.7: SINR<−1.5 dB
Alpha=1.0: SINR<−2.3 dB

In operation 609, the base station computes $\alpha_{NOMA}$ based on the reported SINR and $\alpha_{ICI}$, and P1, and P2.

In operation 611, the bae station re-computes MCSs of the near user and the far user based on the computed $\alpha_{NOMA}$.

An alpha value after overlapping differs from that before overlapping, because of interference caused by an overlapping signal, and thus an MCS needs to be re-computed.

Figure 8A:
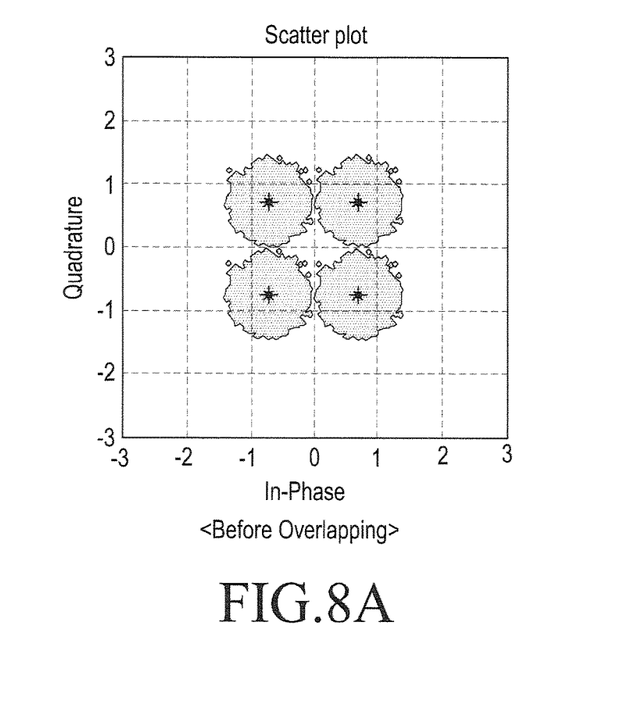
FIGS. 8A and 8B illustrate an alpha value change before overlapping and after overlapping.
Figure 8B:
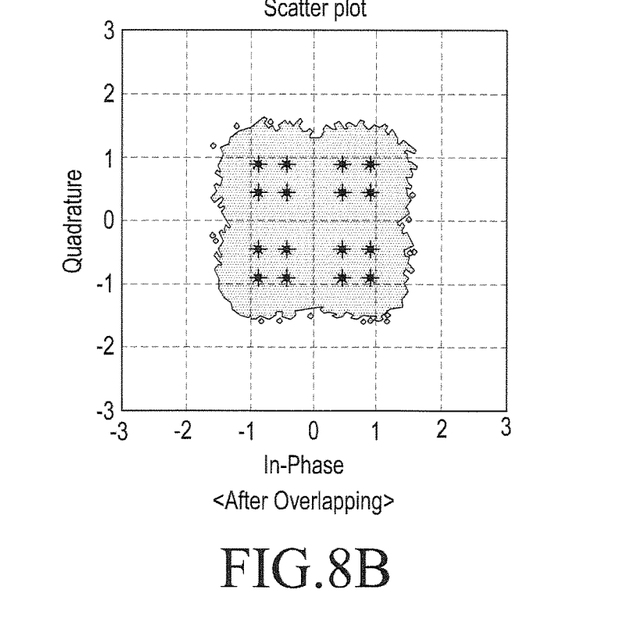

FIGS. 8A and 8B illustrate an alpha value change before overlapping and after overlapping.

The base station knows a magnitude and a modulation method for the overlapping signal and thus may predict a magnitude of an alpha value changing due to overlapping.

In operation 613, the base station determines whether the re-computed MCS value of the far user corresponds to FQAM. If the re-computed MCS value of the far user corresponds to FQAM, the base station transmits an indicator in operation 615.

The indicator may include at least one of whether to transmit FQAM-based NOMA mode, the number of overlapping users, MCS values of overlapping symbols, and power levels of the overlapping symbols.

If the re-computed MCS value of the far user does not correspond to FQAM, the base station returns to operation 607 of performing power allocation.

FIGS. 9A, 9B, 10A, and 10B are graphs showing a channel capacity.

Figure 9A:
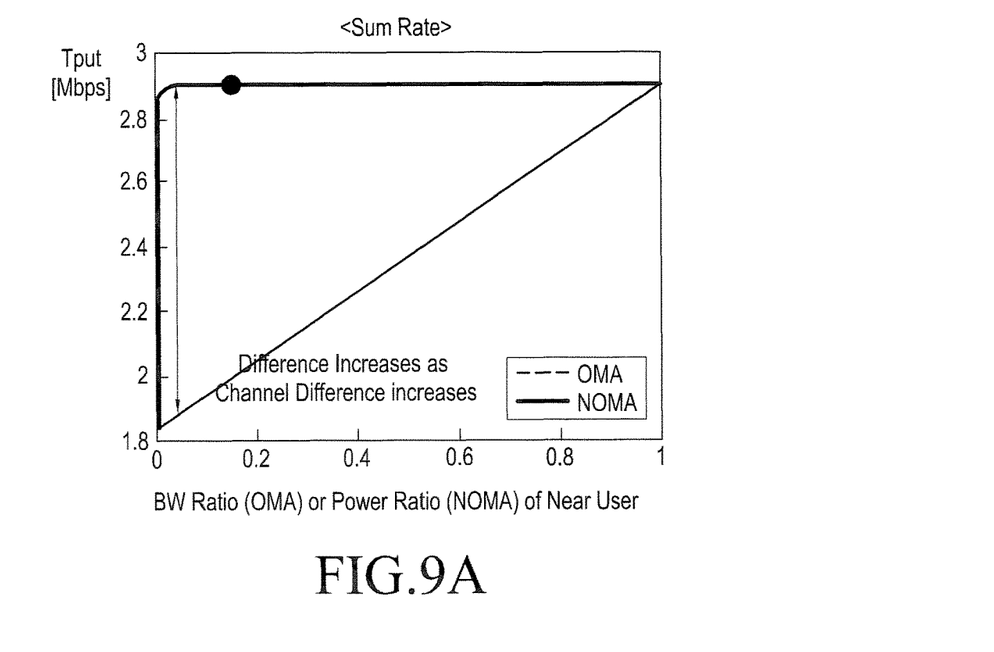
FIGS. 9A, 9B, 10A, and 10B are graphs showing a channel capacity.
Figure 9B:
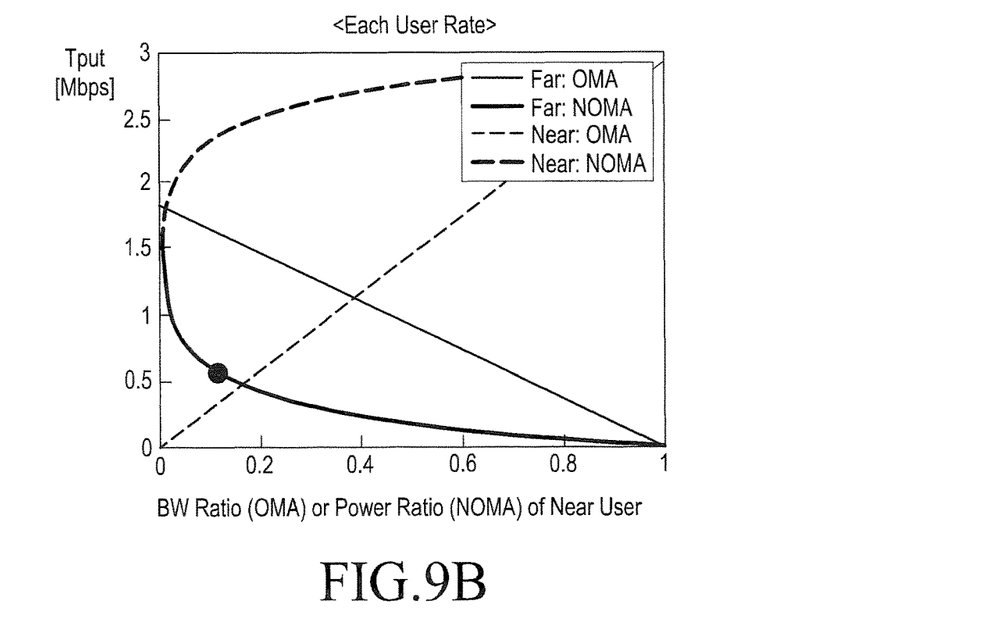
Figure 10A:
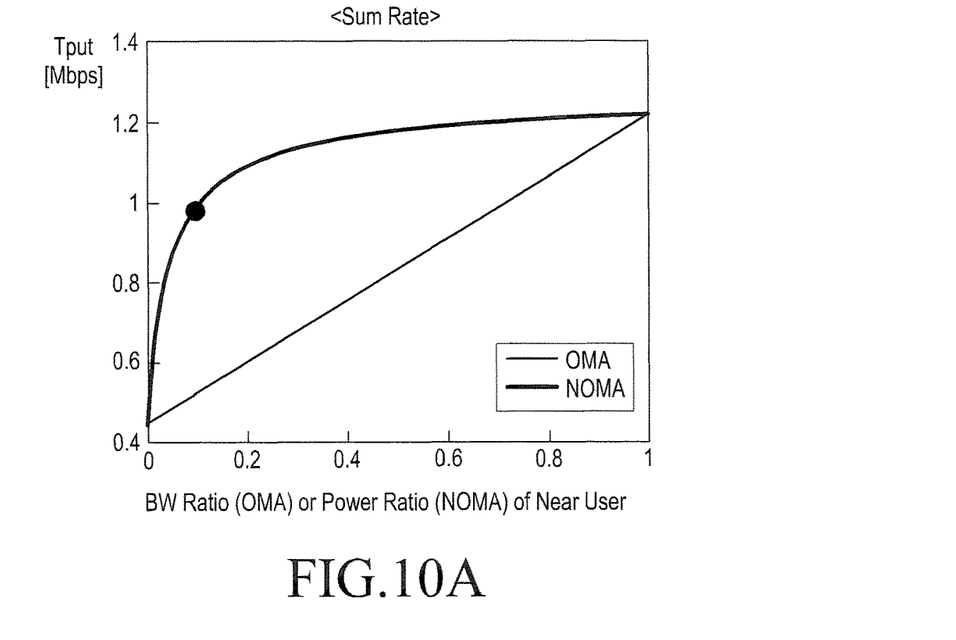
Figure 10B:
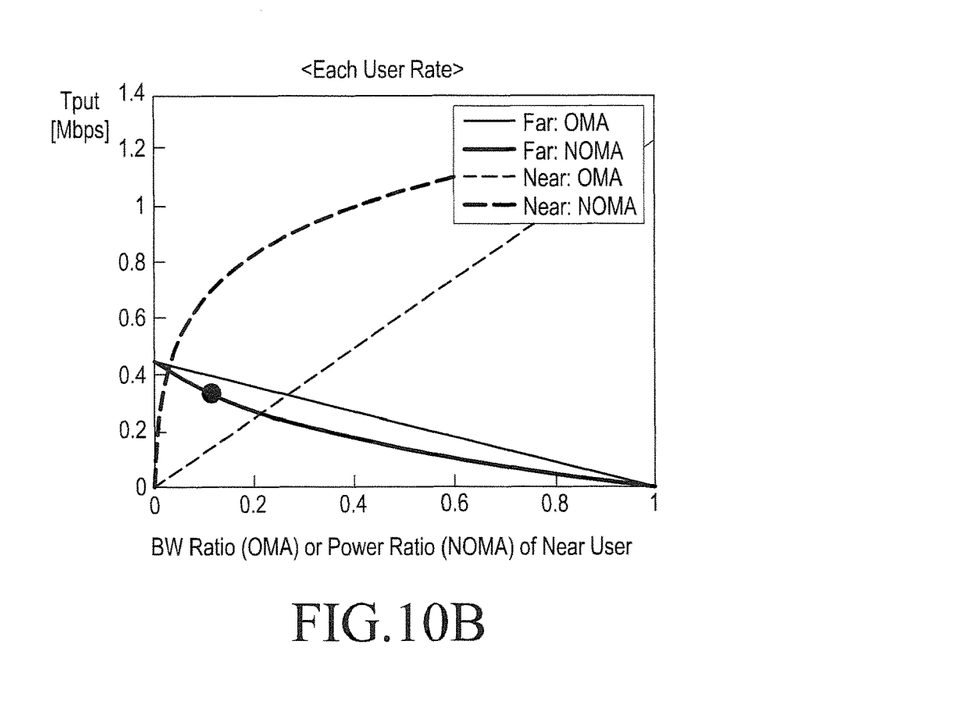

FIGS. 9A and 9B assume single cell, 2-pair, fixed position, and perfect SIC, and FIGS. 10A and 10B assume 7-cell structure, 2-pair, fixed position, and perfect SIC.

In FIGS. 9A and 9B, a near distance is assumed to be about 0.15 km and a far distance is assumed to be about 0.45 km; in FIGS. 10A and 10B, the near distance is assumed to be about 0.15 km and the far distance is assumed to be about 0.35 km.

Referring to FIGS. 9A and 9B, a NOMA system has a high degree of freedom for power allocation, such that an optimal sum rate of the NOMA system is higher than that of an OFDMA system. The NOMA system may have a high cell-edge performance in spite of a low sum rate loss. However, a maximum sum rate is identical for the OFDMA system and the NOMA system (a sum rate for giving all resources to the near user at once in the OFDMA system is equal to a maximum sum rate in the NOMA system).

Referring to FIGS. 10A and 10B, if there is unintended interference such as ICI, a sum rate loss sacrificed for improvement of cell-edge performance increases. Also in this case, a maximum sum rate is identical between the OFDMA system and the NOMA system.

Figure 11:
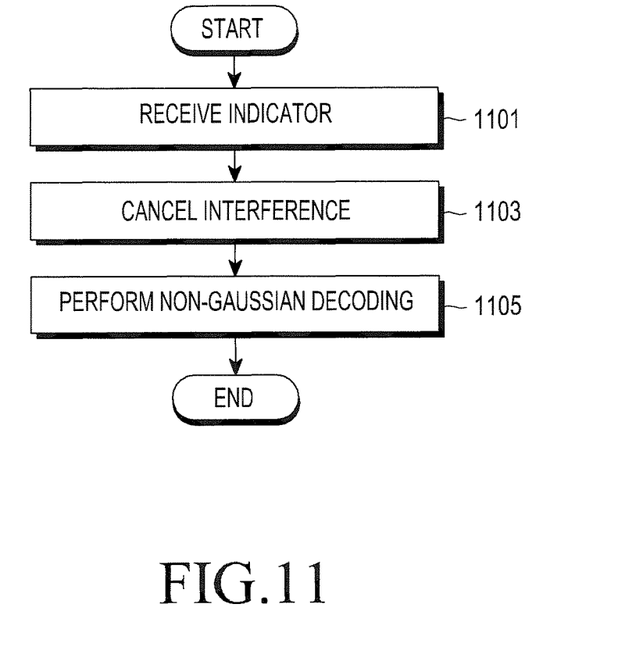
FIG. 11 is a flowchart of a scheduling method in a mobile communication system according to an embodiment of the present disclosure.

FIG. 11 is a flowchart of a scheduling method in a mobile communication system according to an embodiment of the present disclosure.

In operation 1101, the terminal receives an indicator from the base station through a received signal. The indicator may include at least one of whether to transmit FQAM-based NOMA mode, the number of overlapping users, MCS values of overlapping symbols, and power levels of the overlapping symbols.

The received signal received through an $I^{th}$ subcarrier of a $k^{th}$ FQAM symbol may be expressed as follows:

$$Y_l[k] = H_{1,l}[k]s_1[k]\delta_{l,m_1[k]} + J_l[k] \qquad \text{Equation 5}$$

where $$J_l[k] \triangleq \left\{ \sum_{a=2}^{N_{BS}} \sqrt{I_a}\, H_a[k]s_a[k]\delta_{l,m_a[k]} \right\} + \mu_l[k]$$

where I indicates long-term fading, delta indicates a delta function, H indicates short-term fading, μ indicates AWGN, s indicates a QAM symbol, an $N_{BS}$ indicates the number of neighboring cells, and m indicates an FSK symbol index.

In operation 1103, the terminal estimates an alpha value from the received signal and cancels interference from the received signal. A method for estimating the alpha value will be described using Equation 7.

Alpha and beta, which are parameters necessary for CGG PDF and pdf, are computed or estimated using Equation 6.

$$f_{Y[k]}(y[k] \mid \hat{H}_1[k]\cdot m_1[k]\cdot s_1[k]) = \qquad \text{Equation 6}$$

$$\prod_{l=0}^{M_\psi - 1} f_{Y_l[k]}(y_l[k] \mid \hat{H}_{1,l}[k]\cdot m_1[k]\cdot s_1[k])$$

where $$f_{Y_l[k]}(y_l[k] \mid \hat{H}_{1,l}[k]\cdot m_1[k]\cdot s_1[k]) =$$

$$\frac{\alpha}{2\pi\beta^2 \Gamma(2/\alpha)} \exp\left(-\left(\frac{|y[k] - \hat{H}_{1,l}[k]s_1[k]\delta_{l,m_1[k]}|}{\beta}\right)^\alpha\right)$$

In Equation 6, MF indicates an FSK modulation order, and $\hat{s}_l[k], \hat{m}_l[k]$ indicates a hard-decision result of the received signal.

In operation 1105, the terminal performs non-Gaussian decoding.

For the near user, the base station needs an indicator of $\alpha_{NOMA}$ and the terminal has to remove a far user signal by performing non-Gaussian SIC using the indicator.

After the far user signal is removed in the near user, $\alpha_{ICI}$ is re-computed using the remaining signal. A required signal is recovered using the computed $\alpha_{ICI}$.

An example of estimation of α is as shown in Equation 7.

$$\hat{\alpha} = \frac{\ln(3^6/2^{10})}{\ln\left(\frac{\left(\frac{1}{N_s}\sum |Z[k]|\right)^2}{\frac{1}{N_s}\sum |Z[k]|^2} - \pi/4 + 3^2/2^{3.5}\right) + \ln(3/2\sqrt{2})} \qquad [\text{Equation 7}]$$

Z[k] indicates a signal after removal of a channel-compensated signal from a received signal.

Alpha_CQI indicates a signal after removal of a channel-compensated pilot signal from a received pilot.

Alpha_DATA indicates a signal after removal of channel-compensated data from received data (herein, the data is a result of hard decision with respect to the received signal).

β is estimated as below.

$$\hat{\beta} = \frac{\Gamma(2/\hat{\alpha})1}{\Gamma(3/\hat{\alpha})N_S} \sum |\tilde{Z}[k]| \qquad [\text{Equation 8}]$$

In Equation 8, Γ means a gamma function.

LLR calculation by the terminal is as described below.

LLR calculation using a binary code is as expressed in Equation 9.

$$L(b_k^\lambda \mid H[k], \omega[k]) = \qquad \text{Equation 9}$$

$$\ln \frac{\sum_{(i,w)\in A_0^\lambda} f_{\Omega[k]}(\omega[k] \mid H[k]\cdot m[k] = i\cdot s[k] = w)}{\sum_{(i,w)\in A_1^\lambda} f_{\Omega[k]}(\omega[k] \mid H[k]\cdot m[k] = i\cdot s[k] = w)}$$

LLR calculation using an M-ary code is as expressed in Equation 10.

$$L(\omega[k],H[k])=(L_0 L_1 \ldots L_{M-1})$$ [Equation 10]

where $L_i=\ln(f_{\Omega[k]}(\omega[k]|H[k],m[k]=i,s[k]=w))$

On the other hand, for the far user, existing CGGD-based non-Gaussian decoding is performed.

CGGD is determined as given by Equation 11.

$$f_{CG}(x) = \frac{\alpha}{2\pi\beta^2\Gamma(2/\alpha)}\exp\left(-\left(\frac{|x|}{\beta}\right)^\alpha\right)$$ [Equation 11]

Figure 12:
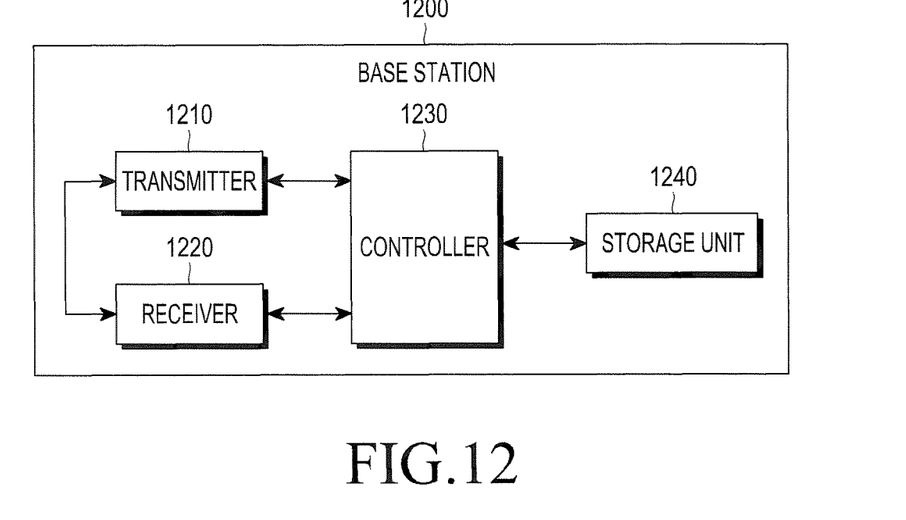
FIG. 12 is a block diagram of a base station according to an embodiment of the present disclosure.

FIG. 12 is a block diagram of a base station according to an embodiment of the present disclosure.

Referring to FIG. 12, the base station may include a transmitter 1210, a receiver 1220, a controller 1230, and a storage unit 1240.

The controller 1230 determines a Gaussian SINR value based on the SINR value and alpha value received from the terminal, performs user pairing based on the Gaussian SINR value, and re-computes an MCS based on the re-computed alpha value.

The controller 1230 is further configured to determine power values P1 and P2 for far terminals based on the SINR value and the alpha value and to re-compute the alpha value based on the determined power values P1 and P2.

If the re-computed MCS value of the far user corresponds to FQAM, the base station transmits an indicator that includes at least one of information indicating whether to transmit an FQAM-based NOMA mode to user, the number of overlapping users, MCS levels of overlapping symbols, and power levels of the overlapping symbols.

The transmitter 1210 and the receiver 1220 perform overall operations for transmitting and receiving signals according to an embodiment of the present disclosure under control of the controller 1230.

Figure 13:
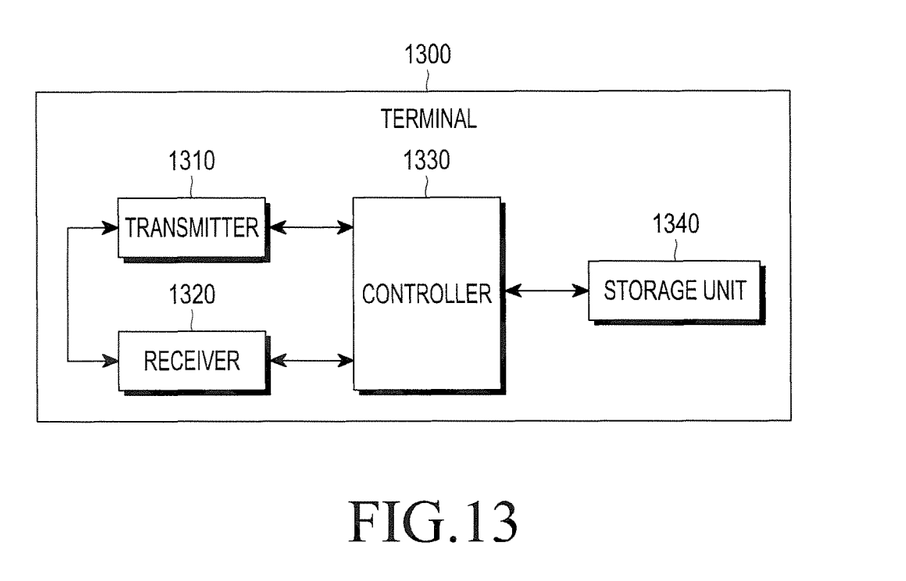
FIG. 13 is a block diagram of a terminal according to an embodiment of the present disclosure.

FIG. 13 is a block diagram of a terminal according to an embodiment of the present disclosure.

Referring to FIG. 13, the terminal may include a transmitter 1310, a receiver 1320, a controller 1330, and a storage unit 1340.

The controller 1330 cancels interference of a received signal based on an indicator received from a base station and performs non-Gaussian decoding according to an embodiment of the present disclosure.

The indicator has been transmitted from the base station to the terminal if a re-computed MCS value of a far user corresponds to FQAM, and MCS re-computation includes determining a Gaussian SINR value based on an SINR value and an alpha value by the base station, performing user pairing based on the Gaussian SINR value, and performing MCS re-computation based on an alpha value re-computed for the paired user.

The transmitter 1310 and the receiver 1320 receive an indicator according to an embodiment of the present disclosure and transmit channel status information in which interference characteristics are reflected to the base station under control of the controller 1330.

The scheduling apparatus and method in a wireless communication system according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the scheduling method in a wireless communication system according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

In addition, the scheduling apparatus in a wireless communication system according to the embodiment of the present invention may receive the program from a program providing device that is connected thereto in a wired or wireless manner, and may store the received program. The program providing device may include a memory for storing a program including instructions for instructing the program processing device to execute a preset scheduling method in a wireless communication system, information necessary for the method, a communication unit for performing wired or wireless communication with the graphic processing device, and a controller for transmitting a corresponding program to the graphic processing device at the request of the apparatus or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A scheduling method by a base station in a wireless communication system, the scheduling method comprising:
   receiving a signal-to-interference-noise ratio (SINR) value and an alpha value from a terminal;
   determining a Gaussian SINR value based on the SINR value and the alpha value;
   performing user pairing based on the Gaussian SINR value;
   re-computing the alpha value; and
   re-computing a modulation and coding scheme (MCS) based on the re-computed alpha value.

2. The method of claim 1, further comprising:
   determining power values P1 and P2 for far terminals based on the SINR value and the alpha value; and
   wherein the re-computed alpha value is re-computed based on the determined power values P1 and P2.

3. The method of claim 1, wherein performing the user pairing comprises performing the user pairing based on at least one of a channel status of each user and a size of a packet to be transmitted to each user.

4. The method of claim 1, wherein performing the user pairing comprises performing the user pairing by selecting a user that is to perform an overlapping transmission using an identical resource at a same time.

5. The method of claim 1, wherein if a re-computed MCS value of a far user corresponds to FQAM, the base station transmits an indicator, and the indicator comprises at least one of whether to transmit FQAM-based NOMA mode to each user, a number of overlapping users, MCS values of overlapping symbols, or power levels of the overlapping symbols.

6. A method for cancelling interference by a terminal in a wireless communication system, the method comprising:

receiving an indicator from a base station;

cancelling interference of a received signal based on the indicator; and performing non-Gaussian decoding, wherein the indicator is transmitted from the base station to the terminal if a re-computed modulation and coding scheme (MCS) value of a far user corresponds to hybrid frequency shift keying (FSK) and quadrature amplitude modulation (QAM) (FQAM), and the re-computing of the MCS value comprises determining a Gaussian SINR value based on an SINR value and an alpha value by the base station, performing user pairing based on the Gaussian SINR value, re-computing the alpha value, and performing MCS re-computation based on the re-computed alpha value for a paired user.

7. The method of claim 6, further comprising:

determining power values P1 and P2 for far terminals based on the SINR value and the alpha value, and wherein the re-computed alpha value is re-computed based on the determined power values P1 and P2.

8. The method of claim 6, wherein the indicator comprises at least one of whether to transmit FQAM-based NOMA mode to each user, a number of overlapping users, MCS values of overlapping symbols, or power levels of the overlapping symbols.

9. The method of claim 6, wherein performing the user pairing comprises performing the user pairing based on at least one of a channel status of each user or a size of a packet to be transmitted to each user.

10. The method of claim 6, wherein performing the user pairing comprises performing the user pairing by selecting a user that is to perform an overlapping transmission using an identical resource at a same time.

11. A scheduling apparatus in a wireless communication system, the scheduling apparatus comprising:

a receiver configured to receive a signal-to-interference-noise ratio (SINR) value and an alpha value from a terminal; and a controller configured to determine a Gaussian SINR value based on the SINR value and the alpha value, perform user pairing based on the Gaussian SINR value, re-compute the alpha value, and re-compute a modulation and coding scheme (MCS) based on the re-computed alpha value.

12. The apparatus of claim 11, wherein the controller is further configured to determine power values P1 and P2 for far terminals based on the SINR value, and wherein the re-computed alpha value is re-computed based on the determined power values P1 and P2.

13. The apparatus of claim 11, wherein the user pairing is performed based on at least one of a channel status of each user or a size of a packet to be transmitted to each user.

14. The apparatus of claim 11, wherein the user pairing is performed by selecting a user that is to perform an overlapping transmission using an identical resource at the same time.

15. The apparatus of claim 11, wherein if a re-computed MCS value of a far user corresponds to FQAM, the apparatus is configured to transmit an indicator, and the indicator comprises at least one of whether to transmit FQAM-based NOMA mode to each user, a number of overlapping users, MCS values of overlapping symbols, or power levels of the overlapping symbols.

16. An apparatus for cancelling interference by a terminal in a wireless communication system, the apparatus comprising:

a receiver configured to receive an indicator from a base station; and a controller configured to cancel interference of a received signal based on the indicator and to perform non-Gaussian decoding, wherein the indicator is transmitted from the base station to the terminal if a re-computed modulation and coding scheme (MCS) value of a far user corresponds to hybrid frequency shift keying (FSK) and quadrature amplitude modulation (QAM) (FQAM), and re-computing of the MCS value comprises determining a Gaussian SINR value based on a SINR value and an alpha value by the base station, performing user pairing based on the Gaussian SINR value, re-computing the alpha value, and performing MCS re-computation based on an alpha value re-computed for a paired user.

17. The apparatus of claim 16, wherein the indicator comprises at least one of whether to transmit FQAM-based NOMA mode to each user, a number of overlapping users, MCS values of overlapping symbols, or power levels of the overlapping symbols.

18. The apparatus of claim 16, wherein the controller is further configured to determine power values P1 and P2 for far terminals based on the SINR value and the alpha value, and wherein the re-computed alpha value is re-computed based on the determined power values P1 and P2.

19. The apparatus of claim 16, wherein the user pairing is performed based on at least one of a channel status of each user or a size of a packet to be transmitted to each user.

20. The apparatus of claim 16, wherein the user pairing is performed by selecting a user that is to perform overlapping transmission using an identical resource at a same time.

* * * * *